(12) United States Patent
Soriano et al.

(10) Patent No.: US 11,660,808 B2
(45) Date of Patent: May 30, 2023

(54) CLEANING MECHANISMS FOR BUILD MATERIAL LEVEL SENSORS

(71) Applicant: HEWLETT-PACKARD DEVELOPMENT COMPANY, L.P., Spring, TX (US)

(72) Inventors: David Soriano, Vancouver, WA (US); Douglas Pederson, Corvallis, OR (US); Nicola Baldo, Sant Cugat del Valles (ES); Steve Ringwald, Corvallis, OR (US); Samrin Sing, Vancouver, WA (US); Matthew Baker, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 76 days.

(21) Appl. No.: 16/607,919

(22) PCT Filed: Jul. 26, 2018

(86) PCT No.: PCT/US2018/043810
§ 371 (c)(1),
(2) Date: Oct. 24, 2019

(87) PCT Pub. No.: WO2020/023039
PCT Pub. Date: Jan. 30, 2020

(65) Prior Publication Data
US 2021/0402695 A1    Dec. 30, 2021

(51) Int. Cl.
*B29C 64/153* (2017.01)
*B33Y 40/00* (2020.01)
(Continued)

(52) U.S. Cl.
CPC ............ *B29C 64/153* (2017.08); *B22F 10/30* (2021.01); *B22F 12/50* (2021.01); *B22F 12/90* (2021.01);
(Continued)

(58) Field of Classification Search
None
See application file for complete search history.

(56) References Cited

U.S. PATENT DOCUMENTS

| 8,718,496 B2 | 5/2014 | Barry et al. |
| 9,643,357 B2 | 5/2017 | Farah et al. |

(Continued)

FOREIGN PATENT DOCUMENTS

| CN | 204451214 U | 7/2015 | |
| WO | WO2016195665 A1 * | 12/2016 | ............ B22F 10/368 |
| WO | WO2017194118 A1 | 11/2017 | |

*Primary Examiner* — Jacob T Minskey
*Assistant Examiner* — Adrien J Bernard
(74) *Attorney, Agent, or Firm* — Shook, Hardy & Bacon L.L.P.

(57) ABSTRACT

In example implementations, a powder level sensor is provided. The powder level sensor includes a capacitive sensor, a processor, and a cleaning mechanism. The processor is communicatively coupled to the capacitive sensor. The processor interprets a measurement of the capacitive sensor to detect a layer of residual build material on a surface of the powder level sensor. The cleaning mechanism may be communicatively coupled to the processor. The processor activates the cleaning mechanism to remove the layer of residual build material on the surface of the powder level sensor.

9 Claims, 5 Drawing Sheets

(51) Int. Cl.
  *B33Y 50/00*   (2015.01)
  *B29C 64/386*  (2017.01)
  *B29C 64/35*   (2017.01)
  *B22F 12/50*   (2021.01)
  *B22F 12/90*   (2021.01)
  *B22F 10/30*   (2021.01)
  *B33Y 10/00*   (2015.01)
  *B22F 10/14*   (2021.01)
  *B22F 12/10*   (2021.01)

(52) U.S. Cl.
  CPC ............ *B29C 64/35* (2017.08); *B29C 64/386* (2017.08); *B33Y 40/00* (2014.12); *B33Y 50/00* (2014.12); *B22F 10/14* (2021.01); *B22F 12/10* (2021.01); *B33Y 10/00* (2014.12)

(56) References Cited

U.S. PATENT DOCUMENTS

| | | | |
|---|---|---|---|
| 2004/0118309 A1* | 6/2004 | Fedor | B22F 10/20 |
| | | | 101/480 |
| 2014/0271328 A1 | 9/2014 | Burris et al. | |
| 2017/0210069 A1 | 7/2017 | Stubenruss | |
| 2017/0304944 A1 | 10/2017 | Symeonidid et al. | |
| 2017/0328761 A1 | 11/2017 | Schwartz et al. | |
| 2018/0036939 A1 | 2/2018 | Sundaresan | |

\* cited by examiner

CLEANING MECHANISMS FOR BUILD MATERIAL LEVEL SENSORS

BACKGROUND

Three dimensional (3D) printers can be used for additive printing. The three dimensional printers can create three-dimensional (3D) objects via the additive printing process. For example, a layer of build material can be dispensed onto a platform, and portions of each layer may be selectively solidified using an appropriate technique. For example, a fusing agent can be applied onto the build material in desired locations (e.g., locations that correspond to areas of the object that will be printed) and energy, such as heat, may be applied generally uniformly to the layer. Portions of the layer on which fusing agent is present may heat up more than portions on which no fusing agent is present, to cause those portions to melt, coalesce, and solidify. The process can then be repeated for each layer until printing of the 3D object is completed.

DETAILED DESCRIPTION

Examples described herein provide a cleaning mechanism for a build material level sensor. As discussed above, 3D printers can use fine powders to generate three dimensional objects. The powder may be dispensed from a storage apparatus, tank, bin, container, and the like. A sensor may be used in the storage container to detect the powder level. The sensor may be positioned to indicate that the storage container is full when the presence of build material is detected by the sensor.

In some instances, the powder can stick to the powder level sensors. Currently used sensors may provide a digital reading. For example, the current sensors may indicate full or not full. In some instances, when powder is stuck on the sensor, the sensor may provide a false positive reading that the powder is present when the storage container is not full and the sensor is not immersed in the powder.

Examples herein provide a sensor that can detect whether build material detected on the sensor is a layer of residual build material that is stuck on the sensor or if the storage container is at a level that is to be measured by the sensor (e.g., at a full level or any intermediate level detected by the sensor). In one example, to prevent false positive readings, the sensor may include a heating element to heat a surface of the sensor to a constant temperature to prevent condensation. Condensation on the surface of the sensor can also provide a false positive.

The sensor may also include a cleaning mechanism. Based on the reading from the sensor (e.g., that the build material is stuck on the surface of the sensor), the sensor may use the cleaning mechanism to remove the residual build material. In one example, the cleaning mechanism may be an air duct that can channel air across the surface of the sensor to remove the powder.

Figure 1:
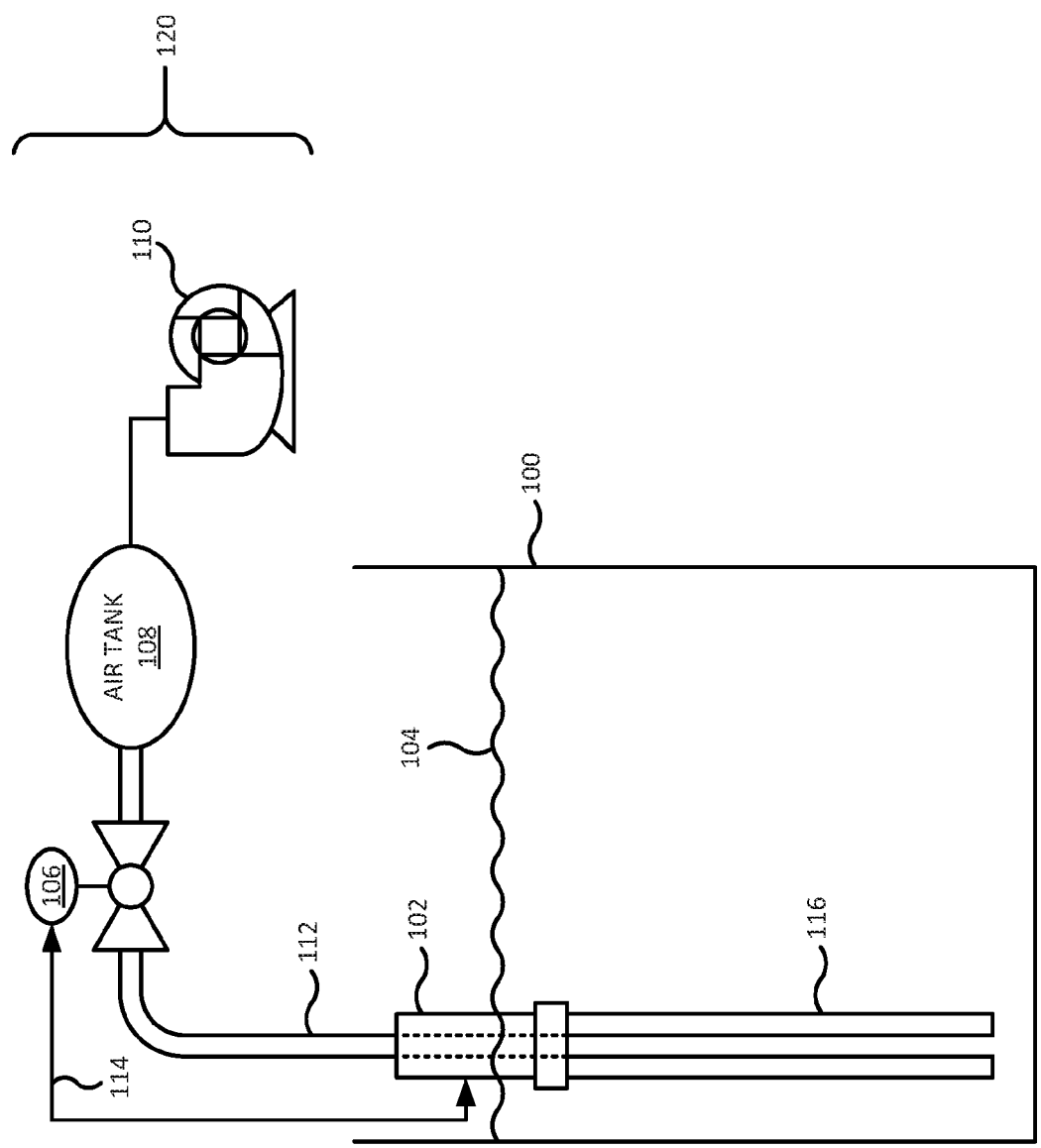
FIG. 1 is a block diagram of an example build material dispenser with a powder level sensor and a cleaning mechanism for the powder level sensor of the present disclosure.

FIG. 1 illustrates an example build material dispenser 100 with a build material (or powder) level sensor 102 of the present disclosure. The build material or powder dispenser 100 may be a container, tub, tank, bowl, and the like that can be used to hold a build material 104. The build material dispenser 100 may be fabricated from a metal or plastic.

In one example, the build material dispenser 100 may be coupled to a three-dimensional (3D) printer (not shown). The build material dispenser 100 may be filled with the build material 104 that is used for an additive printing process by the 3D printer. The build material dispenser 100 may dispense the build material 104 onto a build material bed or platform of the 3D printer. The build material 104 may be any type of powder (e.g., fine metallic or plastic), granular composition, powder-like material, short fiber build material, and the like, that can be melted and fused together to form a 3D object during the additive printing process.

In one example, the powder level sensor 102 may be used to detect a level of the build material 104 in the build material dispenser 100. For example, the powder level sensor 102 may detect when the build material dispenser 100 is at a desired level (e.g., full of the build material 104, when the build material dispenser 100 is empty, or any other desired intermediate level). The powder level sensor 102 may use a capacitive sensor plate 116 to detect the level of the build material 104.

As noted above, some sensors use a capacitive sensor that processes a digital reading. Thus, the sensor detects if build material is on the sensor or not. When build material is on the sensor, the sensor may indicate that the container is full of build material. However, the build material may be a layer of residual build material that is stuck on the sensor even though the container is empty. Thus, some sensors may give a false positive reading.

The powder level sensor 102 of the present disclosure may include a processor (illustrated in FIG. 2 and discussed below) coupled to the capacitive sensor plate 116 that can process a range of analog capacitance values measured by the capacitive sensor plate 116. The analog capacitance values can be interpreted by the processor to determine if the build material 104 detected on the capacitive sensor plate 116 is loose build material in the build material dispenser 100 containing the build material 104 or a layer of residual build material that is stuck on the capacitive sensor plate 116 in an empty build material dispenser 100.

The term "layer of residual build material" or "layer of residual powder" is defined herein to mean build material that is stuck on the capacitive sensor plate 116 in an otherwise empty build material dispenser 100. In other words, the term "layer of residual build material" is meant to refer to build material that is stuck on the capacitive sensor plate 116 rather than loosely flowing in the build material dispenser 100 that contains the build material 104.

For example, due to movement of the build material 104 during dispensing, some of the build material 104 may be electrostatically stuck to the capacitive sensor plate 116. In another example, the build material dispenser 100 may contain excess moisture from condensation. As a result, the some of the build material 104 may stick to the capacitive sensor plate 116 as the level of the build material 104 drops in the build material dispenser 100. Said another way, the term "layer of residual build material" does not refer to any build material that may be contacting the capacitive sensor plate 116 when the build material dispenser 100 contains the build material 104 at a desired level and the build material 104 fills the area or space between the plates (e.g., the capacitive sensor plate 116 and a ground plate) of the powder level sensor 102.

Figure 3:
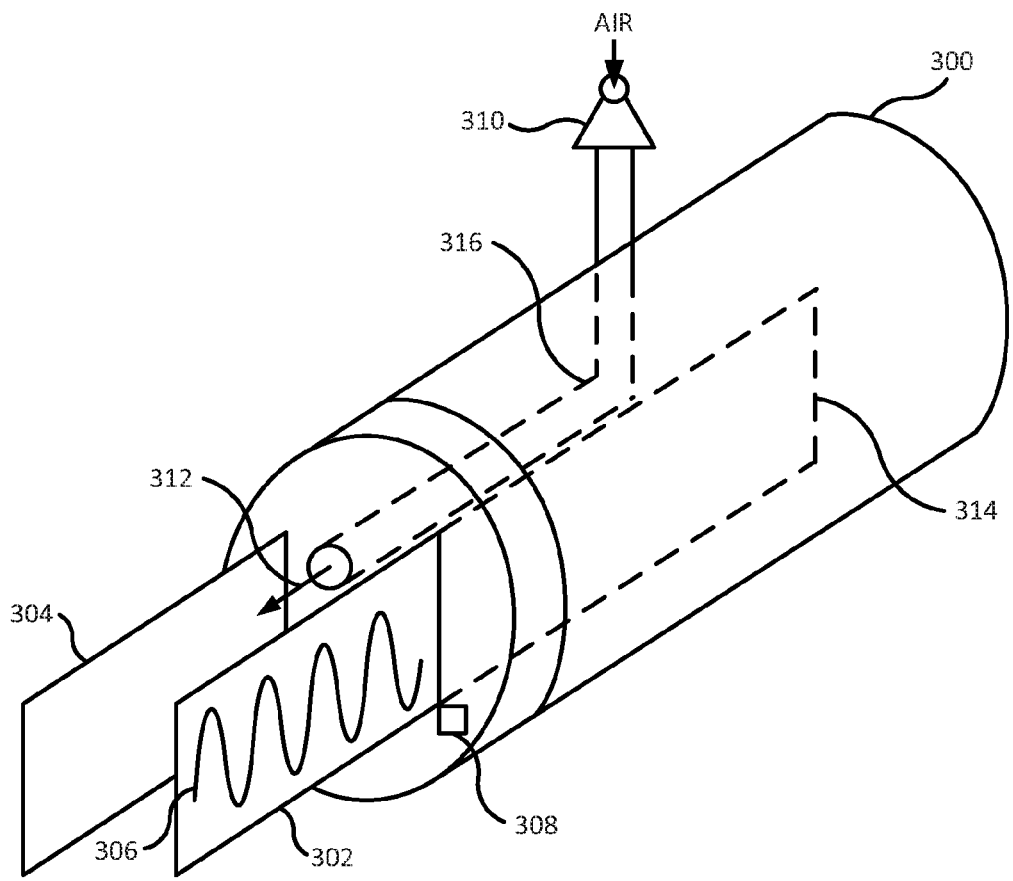
FIG. 3 is an isometric view of an example powder level sensor of the present disclosure.

The powder level sensor 102 may also include a heating element or heater (illustrated in FIGS. 3 and 4, and discussed below). The powder level sensor 102 may heat a surface of the capacitive sensor plate 116 to maintain a constant temperature when an analog capacitive value is measured. The temperature may be a temperature that is high enough to prevent condensation on the surface of the capacitive sensor plate 116. Further details of the heating are discussed below.

In one example, the powder level sensor 102 may also include cleaning mechanism 120 to remove the layer of build material that may be stuck on the capacitive sensor plate 116 when detected by the powder level sensor 102. The cleaning mechanism 120 may include a solenoid valve 106, an air tank 108, and an air pump 110. The air pump 110 may be periodically turned on to fill the air tank 108 with air.

The powder level sensor 102 may include an air channel 112 that runs through the body of the powder level sensor 102 and exits adjacent to the capacitive sensor plate 116. The powder level sensor 102 may also be communicatively, or electrically, connected to the solenoid valve 106 via a communication path 114.

In one example, when the powder level sensor 102 detects the layer of build material stuck on the capacitive sensor plate 116 (as opposed to detecting build material in a full build material dispenser 100), the powder level sensor 102 may activate the cleaning mechanism 120. For example, the powder level sensor 102 may send a signal via the communication path 114. The signal may open the solenoid valve 106 to allow air to pass through the air channel 112.

The air channel 112 may be sized to allow the air to exit at a high enough pressure and velocity to remove the layer of build material that is stuck on the capacitive sensor plate 116. The exit opening of the air channel 112 located adjacent to the capacitive sensor plate 116 may be positioned or angled to maximize the amount of air that blows across the surface of the capacitive sensor plate 116.

In one example, the powder level sensor 102 may send signals across the communication path 114 to periodically open and close the solenoid valve 106. For example, the solenoid valve 106 may be opened for small amounts of time (e.g., 100 milliseconds). As a result, periodic pulses of air puffs may be blown across the capacitive sensor plate 116.

In some examples, the powder level sensor 102 controls the cleaning mechanism 120 such that the solenoid valve 106 is not opened at the same time a capacitive value is measured by the capacitive sensor plate 116. Thus, the powder level sensor 102 can ensure that the cleaning event does not interfere with the analog reading of the capacitive sensor plate 116.

Figure 2:
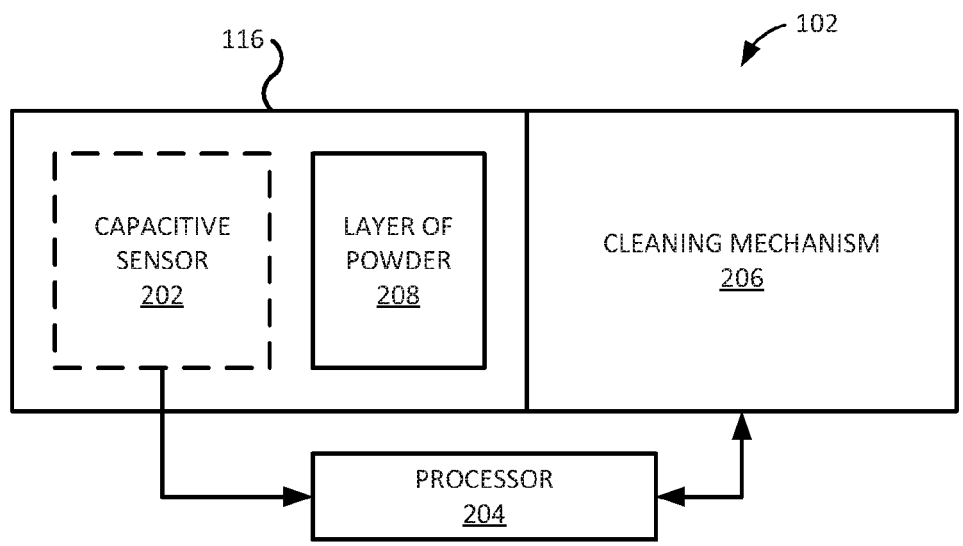
FIG. 2 is a block diagram of an example powder level sensor of the present disclosure.

FIG. 2 illustrates a high level block diagram of the powder level sensor 102. FIG. 2 illustrates the capacitive sensor plate 116. In one example, the capacitive sensor plate 116 may include a capacitive sensor 202. As discussed above, the capacitive sensor 202 may measure an analog capacitance value of a layer of build material 208 that may be stuck on the capacitive sensor plate 116.

The capacitive sensor 202 may be communicatively coupled to a processor 204. As noted above, the processor 204 may process and use a range of the analog capacitance values measured by the capacitive sensor 202 to detect the layer of build material 208 (as opposed to build material 104 that fills the build material dispenser 100). In one example, the processor 204 may be a specialized chip or application specific chip that can interpret the analog capacitance value. In one example, the processor 204 may be an inter-integrated chip ($I^2C$) chip.

In one example, analog capacitance values of different thickness levels of build material 104 can be measured before the powder level sensor 102 is deployed. A particular thickness may be determined to be associated with the layer of build material 208 stuck on the capacitive sensor plate 116 as opposed to free flowing build material 104 in a full build material dispenser 100. For example, a particular type of build material may stick to form the layer of build material 208 that is 1 millimeter (mm) thick. A thickness more than that may indicate that the build material dispenser 100 is full as build material may not form a layer thicker than 1 mm without falling off if the build material dispenser 100 were empty. Another type of build material may stick to form the layer of build material 208 that is 5 mm thick. The analog capacitance value associated with the thickness of the build material in the layer of build material 208 may be selected as a threshold value.

Thus, a threshold value for a particular type of build material may be provided to the processor 204. In some examples, the powder level sensor 102 may include a memory (e.g., the non-transitory computer readable medium illustrated in FIG. 6, and discussed below) to store the threshold value. The processor 204 may receive the analog capacitance value from the capacitive sensor 202. When the analog capacitance value is above the threshold value, the processor 204 may determine that the build material is detected due to the build material dispenser 100 being full of the build material 104.

However, when the analog capacitance value is below the threshold value, the processor 204 may determine that the build material is detected due to the layer of build material 208 being stuck on the capacitive sensor plate 116. In other words, the build material that is detected is causing a false positive on the capacitive sensor 202 and the build material dispenser 100 may be empty.

The processor 204 may be communicatively coupled to a cleaning mechanism 206. In one example, the cleaning mechanism 206 may be the same as the cleaning mechanism 120 illustrated in FIG. 1, and described above. In response to the layer of build material 208 being detected on the capacitive sensor plate 116, the processor 204 may activate the cleaning mechanism 206. The cleaning mechanism 206 may remove the layer of build material 208 that is stuck on the surface of the capacitive sensor plate 116 (e.g., due to electrostatic charges or moisture) of the powder level sensor 102.

The capacitive sensor plate 116 may be deployed as a single plate or adjacent plates or electrodes. FIG. 3 illustrates an example of a powder level sensor 300 that uses multiple plates. In one example, the powder level sensor 300 may include a capacitive sensor plate 302 and a separate ground plate 304. It should be noted that a length of the capacitive sensor plate 302 and the ground plate 304 may vary depending on a depth of the build material dispenser 100.

The capacitive sensor plate 304 may comprise a printed circuit board (PCB) that extends into a body of the powder level sensor 300 as shown by dashed lines 314. The PCB may include the capacitive sensor 202, the processor 204, and other electronics associated with the powder level sensor 300.

In one example, the capacitive sensor plate 302 may also include resistive traces 306 that may form a heating element. The resistive traces 306 may be embedded below the surface of the capacitive sensor plate 302. The resistive traces 306 be connected to a driver or power supply that can supply current through the resistive traces 306 (as controlled by the processor 204) to generate heat.

The powder level sensor 300 may also include a temperature sensor 308. The temperature sensor 308 may be a thermistor or any other type of temperature reading device. The temperature sensor 308 may be communicatively coupled to the processor 204 and measure the temperature of the capacitive sensor plate 302 as the capacitive sensor plate 302 is heated by the resistive traces 306. The processor 204 may control the current that is driven through the resistive traces 306 to maintain a constant temperature. As noted above, the temperature may be a temperature to prevent condensation from forming on the surface of the capacitive sensor plate 302. The temperature can be pre-defined during calibration of the powder level sensor 300 before deployment. The pre-defined temperature can be stored in a memory of the powder level sensor 300 as a temperature threshold to control heating of the capacitive sensor plate 302.

In one example, the powder level sensor 300 may also include an air channel 310 that runs through the body of the powder level sensor 300, as shown by dashed lines 316. The air channel 310 may be connected to a cleaning mechanism (e.g., the cleaning mechanism 120 or 206). Air may be injected into the air channel 310 and exit out an outlet opening, as shown by an arrow 312.

The outlet opening may be located between the capacitive sensor plate 302 and the ground plate 304. The outlet opening may be shaped to eject the air at a velocity and pressure that is high enough to remove a layer of build material that may be stuck to the capacitive sensor plate 302 and/or the ground plate 304. The outlet opening may also be shaped to disperse the air wide enough to blow against, or across, the surface of both the capacitive sensor plate 302 and the ground plate 304.

Figure 4:
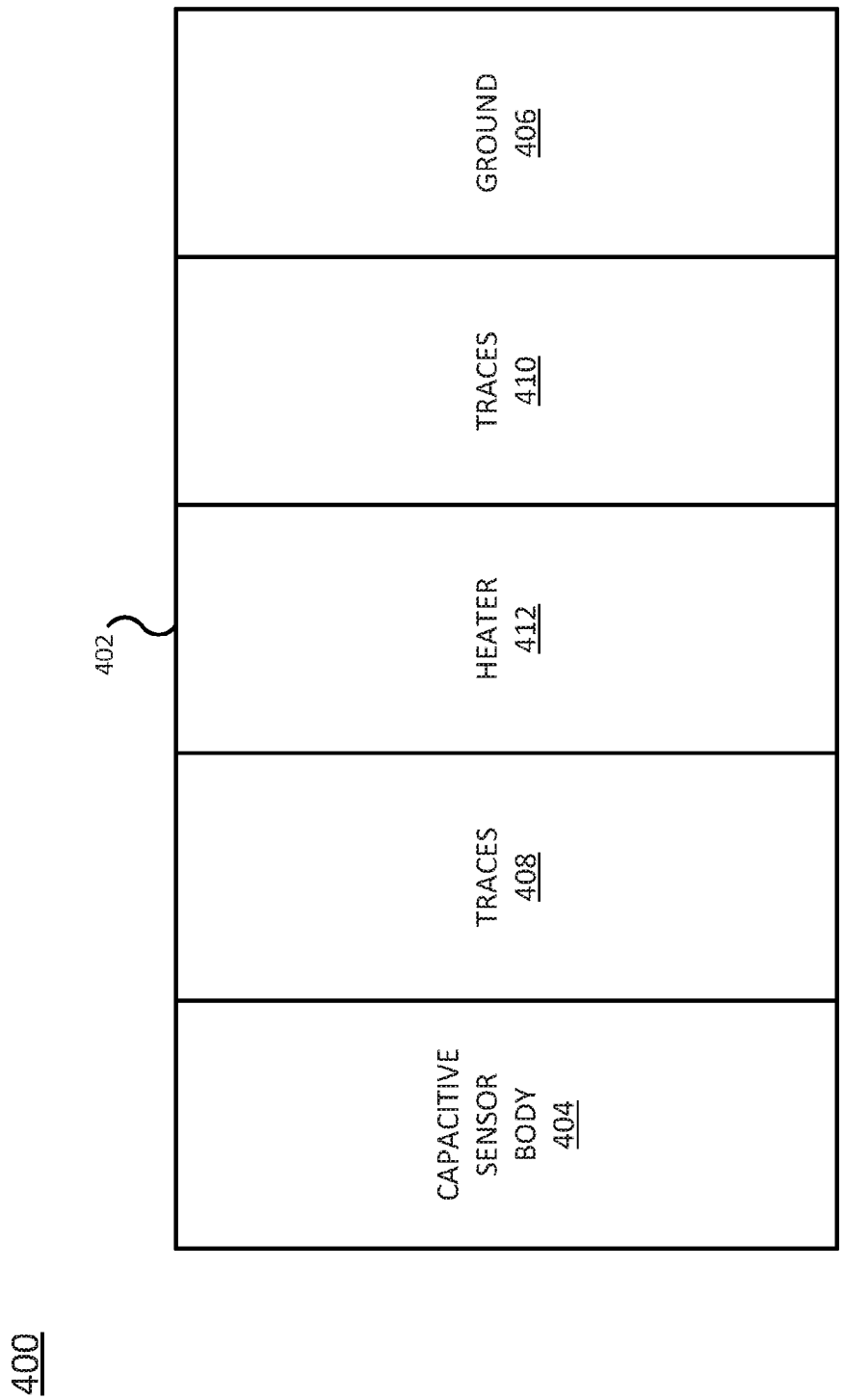
FIG. 4 is a block diagram of example layers of a single plate powder level sensor of the present disclosure.

FIG. 4 illustrates an example of a single plate powder level sensor 400. In one example, the powder level sensor 400 may include a single capacitive sensor plate 402 that is comprised of multiple layers 404-412. The single capacitive sensor plate 402 may be enclosed in a housing and coupled to a processor and cleaning mechanism (e.g., the processor 204 and the cleaning mechanism 120 or 206).

The layer 404 may be the capacitive sensor body and the layer 406 may be the ground. The layers 404 and 406 may form the outer layers of the single capacitive sensor plate 402. The layer 408 may be located adjacent to the layer 404 and the layer 410 may be located adjacent to the layer 406. The layers 408 and 410 may include resistive traces (e.g., the electrical communication paths in the printed circuit board). The layer 412 may include the heater used to heat the single capacitive sensor plate 402.

In one example, the layer 412 may include multiple layers. For example, one layer may be a heater high layer and a second layer may be a heater low layer. The two heater layers of the layer 412 may form a ground and power to complete a heater circuit.

Figure 5:
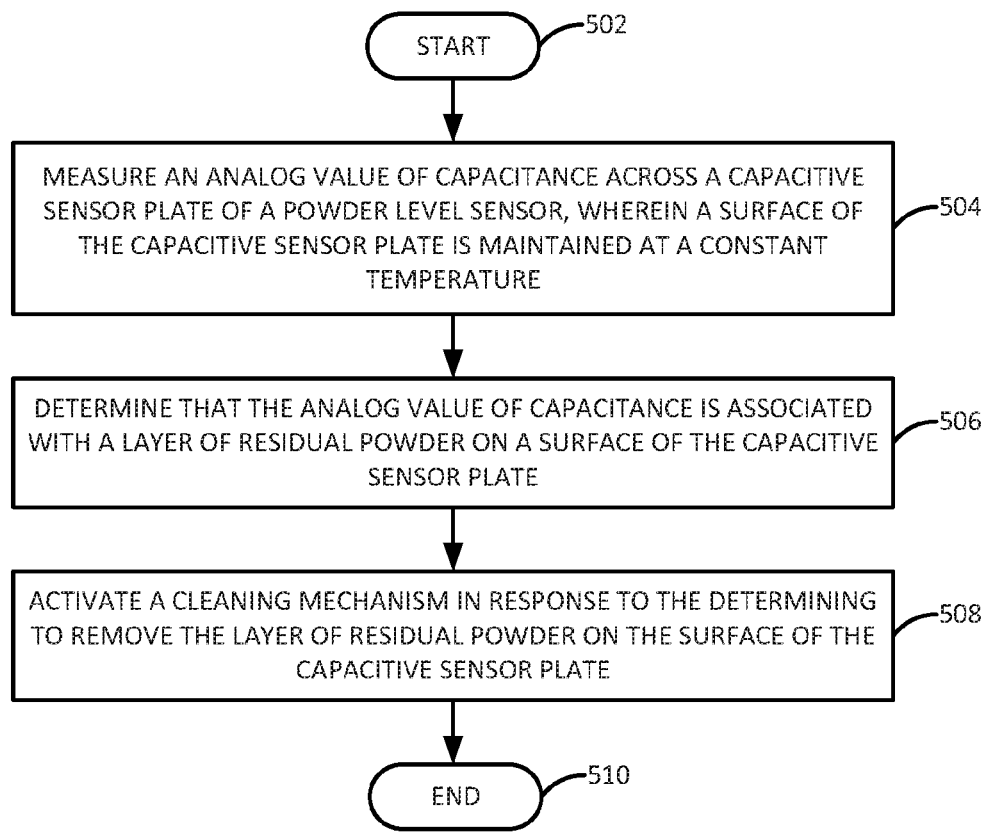
FIG. 5 is a flow chart of an example method for cleaning a powder level sensor.

FIG. 5 illustrates a flow diagram of an example method 500 for cleaning a powder level sensor. In an example, the method 500 may be performed by the powder level sensor 102, 300, 400 or the apparatus 600 illustrated in FIG. 6 and described below.

At block 502, the method 500 begins. At block 504, the method 500 measures an analog value of capacitance across a capacitive sensor plate of a powder level sensor, wherein a surface of the capacitive sensor plate is maintained at a constant temperature. In one example, the analog value of capacitance can be measured while the capacitive sensor plate is maintained at a constant temperature. The temperature that is maintained may be a pre-defined temperature that prevents condensation from forming on the capacitive sensor plate. As noted above, condensation may interfere with obtaining accurate capacitance measurements across the capacitive sensor plate.

In one example, the capacitive sensor plate may be heated by applying current through resistive traces in the capacitive sensor plate. The resistive traces may be created in the capacitive sensor plate in a serpentine pattern. The powder level sensor may include a temperature sensor that measures a temperature of the surface of the capacitive sensor plate. The temperature may be compared to a temperature threshold. When the temperature is above the temperature threshold, the heater can be turned off (e.g., the processor may stop applying current through the resistive traces). When the temperature is below the temperature threshold, the heater can be turned on (e.g., the processor may cause current to be applied through the resistive traces).

In one example, the amount of current may be determined based on a relationship of $P=I^2R$, where P represents power, I represent current, and R represents a resistance of the trace. The power may be proportional to the heat, and therefore, the temperature of the capacitive sensor plate.

At block 506, the method 500 determines that the analog value of capacitance is associated with a layer of residual build material on a surface of the capacitive sensor plate. For example, the processor may be able to process a range of analog capacitance values to distinguish between loose build material in a full build material dispenser or a layer of build material that is stuck to a capacitive sensor plate in an empty build material dispenser.

In one example, the analog value of capacitance may be compared to a threshold value. As noted above, the threshold value may be determined before the powder level sensor is deployed. The threshold value may be an analog value of capacitance that is associated with a thickness of a layer of build material that may be formed on the capacitive sensor plate for a particular build material.

When the analog value of capacitance is greater than the threshold value, the processor may determine that the build material dispenser is full of build material. When the analog value of capacitance is less than or equal to the threshold value, the processor may determine that the build material dispenser is empty and that a layer of build material is stuck on a surface of the powder level sensor (e.g., the capacitive sensor plate or ground plate).

At block 508, the method 500 activates a cleaning mechanism in response to the determining to remove the layer of build material on the surface of the capacitive sensor plate. Thus, when the processor detects a layer of build material stuck on the surface of the capacitive sensor plate based on the measured analog value of capacitance, the processor may activate the cleaning mechanism.

In one example, the cleaning mechanism may be a system of air that is blown through the powder level sensor and out adjacent to the capacitive sensor plate. The air may be ejected with enough velocity and pressure to remove the layer of build material that is stuck on the capacitive sensor plate and/or ground plate.

In one example, an air pump may be activated to generate air. The air may be stored in an air tank. A valve may be opened to release air through an air channel of the powder level sensor and out across the capacitive sensor plate. The valve may be periodically opened and closed to generate pulses of an air puff.

In one example, the cleaning mechanism may be controlled to prevent interference with an analog capacitance measurement. For example, if the powder level sensor is measuring the analog capacitance value, the cleaning mechanism may not be activated. The cleaning mechanism may be activated after the analog capacitance measurement is completed. At block 510, the method 500 ends.

Figure 6:
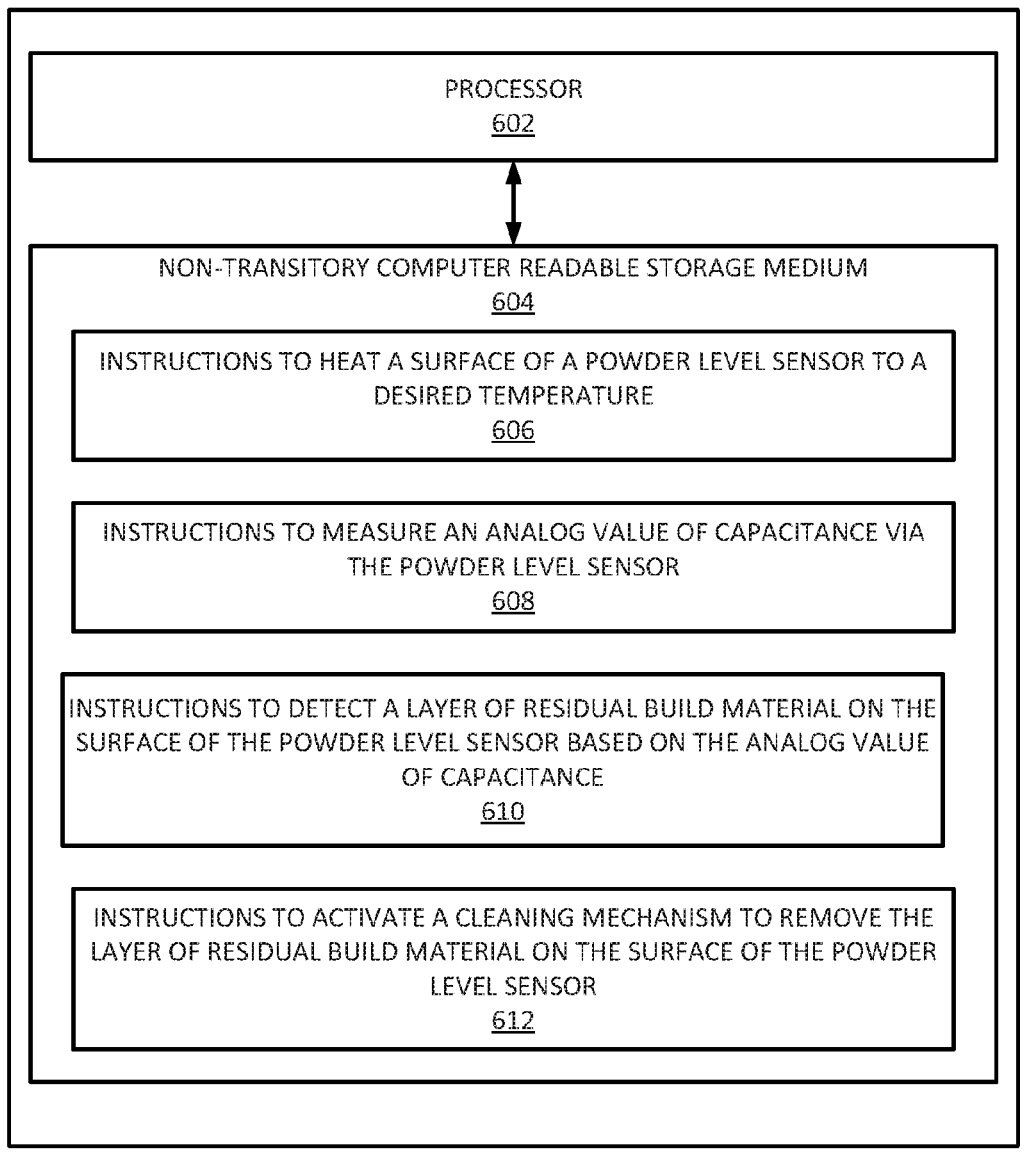
FIG. 6 is a block diagram of an example non-transitory computer readable storage medium storing instructions executed by a processor to clean a powder level sensor.

FIG. 6 illustrates an example of an apparatus 600. In one example, the apparatus 600 may be the powder level sensor 102, 300, or 400. In one example, the apparatus 600 may include a processor 602 and a non-transitory computer readable storage medium 604. The non-transitory computer readable storage medium 404 may include instructions 606, 608, 610, and 612 that, when executed by the processor 602, cause the processor 602 to perform various functions to clean a powder level sensor.

In one example, the instructions 606 may include instructions to heat a surface of a powder level sensor to a desired temperature. The instructions 608 may include instructions to measure an analog value of capacitance via the powder level sensor. The instructions 610 may include instructions to detect a layer of build material on the surface of the powder level sensor based on the analog value of capacitance. The instructions 612 may include instructions to activate a cleaning mechanism to remove the layer of build material on the surface of the powder level sensor.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A build material level sensor, comprising:
a capacitive sensor;
a processor communicatively coupled to the capacitive sensor to interpret a measurement of the capacitive sensor to detect a layer of residual build material on a surface of the build material level sensor, wherein the layer of residual build material comprises build material that is stuck on the capacitive sensor in an otherwise empty build material dispenser; and
a cleaning mechanism communicatively coupled to the processor, wherein the processor activates the cleaning mechanism to remove the layer of residual build material on the surface of the build material level sensor.

2. The build material level sensor of claim 1, wherein the measurement comprises an analog value of capacitance and the layer of residual build material on the surface of the build material level sensor is detected when the analog value is lower than a threshold value.

3. The build material level sensor of claim 1, further comprising:
a temperature sensor communicatively coupled to the processor to measure a temperature of the surface of the build material level sensor; and
a heater communicatively coupled to the processor to heat the surface of the build material level sensor when the temperature falls below a temperature threshold value.

4. The build material level sensor of claim 3, wherein the heater comprises a trace, wherein a current is applied to the trace by the processor based on the temperature that is measured to generate heat.

5. The build material level sensor of claim 1, wherein the cleaning mechanism comprises:
an air pump to generate air; and
an air channel located adjacent to the surface of the build material level sensor to blow the air across the surface of the build material level sensor.

6. The build material level sensor of the claim 5, wherein the cleaning mechanism further comprises:
a solenoid valve communicatively coupled to the processor, wherein the processor controls operation of the solenoid valve based on detection of the layer of residual build material on the surface of the build material level sensor.

7. The build material level sensor of claim 1, further comprising:
a non-transitory machine-readable storage medium encoded with instructions executable by the processor, the machine-readable storage medium comprising:
instructions to heat the surface of the build material level sensor to a desired temperature;
instructions to measure an analog value of capacitance via the build material level sensor;
instructions to detect the layer of residual build material on the surface of the build material level sensor based on the analog value of capacitance; and
instructions to activate the cleaning mechanism to remove the layer of residual build material on the surface of the build material level sensor.

8. The build material level sensor of claim 1, wherein the cleaning mechanism is located between a capacitive sensor plate and a ground plate.

9. The build material level sensor of claim 6, wherein the solenoid valve is controlled to periodically open and close to create pulses of an air puff.

* * * * *